United States Patent [19]

Maxson et al.

[11] Patent Number: 4,587,288

[45] Date of Patent: May 6, 1986

[54] SILICONE WATER-BASED PUTTY

[75] Inventors: Myron T. Maxson; Christine J. Schoenherr, both of Midland, Mich.

[73] Assignee: Dow Corning Corporation, Midland, Mich.

[21] Appl. No.: 729,834

[22] Filed: May 2, 1985

[51] Int. Cl.$^4$ .............................................. C08K 3/26
[52] U.S. Cl. ..................... 524/425; 524/588; 524/783; 524/786; 524/788; 524/789; 524/847; 524/860; 528/18; 528/34; 528/901
[58] Field of Search ............... 524/788, 786, 783, 789, 524/847, 860, 425, 588; 528/18, 34, 901

[56] References Cited

U.S. PATENT DOCUMENTS

| | | | |
|---|---|---|---|
| 3,355,406 | 11/1967 | Cekada | 260/18 |
| 4,427,811 | 1/1984 | Elias et al. | 524/445 |
| 4,504,621 | 3/1985 | Lefler, III | 524/863 |
| 4,505,955 | 3/1985 | Meddaugh | 524/493 |

*Primary Examiner*—Melvyn I. Marquis
*Attorney, Agent, or Firm*—Edward C. Elliott

[57] ABSTRACT

A silicone composition useful as a caulking material consists essentially of an aqueous emulsion of a hydroxyl endblocked polydiorganosiloxane, dialkyltindicarboxylate, phenyltrimethoxysilane, and inert nonsiliceous filler. The composition is of a paste-type viscosity while an emulsion, then becomes a soft, putty-type material having a plasticity number of from 125 to 300 when the water is removed from the emulsion. The dried composition remains a soft, putty-like material upon aging.

7 Claims, No Drawings

SILICONE WATER-BASED PUTTY

BACKGROUND OF THE INVENTION

1. Field of the Invention

This invention is directed to a silicone, water-based composition which has a paste-type viscosity and which yields a putty, upon removal of the water at room temperature, which putty does not harden upon aging, is insoluble in water, and adheres to most surfaces.

2. Background Information

A number of compositions have been disclosed which are aqueous emulsions which cure upon removal of the water. An emulsion having improved shelf life which can be formulated to be useful as a caulking material is disclosed in U.S. Pat. No. 4,427,811 issued Jan. 24, 1984 by Elias and Freiberg. The caulking material formed is an elastomeric product having significant tensile strength and elongation.

Cekada disclosed latexes which formed a film of silicone rubber or plastic in U.S. Pat. No. 3,355,406, issued Nov. 28, 1967. In his Example 1 for instance, he combined a linear hydroxyl endblocked polydimethylsiloxane, his phenylsilsesquioxane filler, phenyltrimethoxysilane, and dibutyltindilaurate to obtain an emulsion which yielded rubber films having substantial hardness, tensile strength, and elongation upon removal of the water from the emulsion. Several additional examples are shown using phenyltrimethoxysilane as a crosslinker and elastomers as the products obtained. He teaches that suitable crosslinking agents have the general formula $A_mSi(OR''')_{4-m}$ with trifunctional silanes preferred. He does not teach any differences among the silanes used in their effect upon the rubber obtained.

These references disclose compositions which produce elastomers upon removal of the water. They do not teach any method of producing an emulsion which is a putty upon removal of the water.

SUMMARY OF THE INVENTION

An aqueous emulsion which is of a paste-type viscosity so that it is suitable as a caulking material has been developed that yields a product upon removal of the water that is a putty-type material having a plasticity number of from 125 to 300, adheres to most substrates to which it is applied, is insoluble in water, and does not harden appreciably upon aging. The silicone putty consists essentially of the product obtained by mixing hydroxyl endblocked polydiorganosiloxane emulsion, dialkyltindicarboxylate, phenyltrimethoxysilane, and inert, non-siliceous filler in the proper ratio.

It is an object of this invention to produce an aqueous emulsion, having a paste-type viscosity so that it is suitable as a caulking material, that yields a putty-like product which is adherent, non-water soluble, and which does not appreciably harden upon aging.

DESCRIPTION OF THE INVENTION

This invention is directed to a silicone putty consisting essentially of the product obtained by mixing (A) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms or 2-(perfluoroalkyl)ethyl radicals having less than 7 carbon atoms per radical, present as an emulsion of dispersed particles in water, the emulsion having a pH of greater than 9 and a solids content of greater than 50% by weight, (B) from 0.05 to 0.4 part by weight of dialkyltindicarboxylate, (C) from 1 to 12 parts by weight of phenyltrimethoxysilane, and (D) from 50 to 200 parts by weight of inert, non-siliceous filler having an average particle size of less than 2 micrometers, to produce a material having a paste viscosity which, when the water is removed, has a plasticity number of from 125 to 300, is insoluble in water, and does not harden appreciably on aging.

The silicone composition of this invention is an aqueous emulsion having a viscosity such that it is a paste-type material. The silicone composition has this viscosity limitation because it is intended to be used as a caulking material useful in filling cracks and spaces in vertical, overhead, and horizontal surfaces. Upon removal from a storage container, the composition dries due to evaporation of the water. The dried material is a soft deformable material which is adhered to the substrate it was upon when dried. If placed under pressure as in a plastometer, the dried material slowly flows to give a plasticity number of from 125 to 300 when measured in accordance with ASTM D926. This plasticity range is that obtained when the plasticity is measured shortly after the water is removed from the composition, for example, up to 7 days. Upon aging for longer periods of time, for example, 30 days, the plasticity raises slightly, for example, up to 20 percent. Upon aging yet longer, 9 months for example, the plasticity raises, for example, up to 35 percent. When pulled apart, the fractured surfaces will adhere to each other, if placed in contact. The dried material will not dissolve when it is placed in water. The dried material does not appreciably harden upon aging but remains a very soft elastomer.

For purposes of this invention, a paste-type material is defined as a material which is hard enough to give a flow of from 0 to 2.54 cm when measured in accordance with ASTM D 2202 and soft enough so that the extrusion rate is greater than 50 grams per minute at a pressure of 0.62 MPa using a 3.18 mm orifice, measured in accordance with Military Specification MIL-S-88020. A preferred material has a flow of from 0 to 0.8 cm. If the silicone composition is intended for use in vertical or overhead locations, it is preferable that the flow be in this range so that the composition remains in place when extruded and tooled. If the composition is intended only for use in horizontal locations, such as highway joints for example, it is preferred that there be some flow, from 2 mm to 2 cm for example, so that the composition flows and wets the sides of the opening being sealed so that a good bond is obtained.

Because caulking material is commonly stored in a tube and extruded through a nozzle as it is used, the silicone composition has an extrusion rate of greater than 50 grams per minute. The preferred flow rate for compositions of this invention is greater than 500 grams per minute under the above test conditions. Embodiments of this invention can be easily prepared which have both a low flow and a high extrusion rate. This is distinctly different than caulking materials based upon silicone elastomers which are not in emulsion form.

The anionically stabilized, hydroxyl endblocked polydiorganosiloxane used in this invention is now well-known in the art. The hydroxyl endblocked polydiorganosiloxane (A) is one which can be emulsified, which imparts elastomeric properties to the product obtained after the removal of the water from the emulsion, and which is anionically stabilized. Tensile strengths and elongations at break improve with increasing weight average molecular weight(Mw), with suitable tensile strengths and elongations obtained above 50,000 Mw. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical for this invention. The preferred Mw for the hydroxyl endblocked polydiorganosiloxanes are in the range of 200,000 to 700,000.

The organic radicals of the hydroxyl endblocked polydiorganosiloxane can be monovalent hydrocarbon radicals containing less than seven carbon atoms per radical and 2-(perfluoroalkyl)ethyl radicals including 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom but may include trace amounts of monoorganosiloxane or triorganosiloxy units present as impurities of the manufacturing process. The preferred hydroxyl endblocked polydiorganosiloxanes are the hydroxyl endblocked polydimethylsiloxanes.

The preferred anionically stabilized, hydroxyl endblocked polydiorganosiloxanes are those prepared by the method of anionic emulsion polymerization described by Findlay et al. in U.S Pat. No. 3,294,725, issued Dec. 27, 1966, which is hereby incorporated by reference to show the methods of polymerization, the ingredients used, and the hydroxyl endblocked polydiorganosiloxane obtained in an emulsion. Another method of preparing the anionically stabilized, hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes, the ingredients used, and their method of preparation. These methods and others are known in the art. The hydroxyl endblocked polydiorganosiloxanes used in this invention are those which anionically stabilized. For the purpose of this invention "anionically stabilized" means the hydroxyl endblocked polydiorganosiloxane is stabilized in emulsion with an anionic surfactant. This silicone emulsion is in the form of an oil-in-water emulsion, i.e., the polydiorganosiloxane is a dispersed phase of particles in a continuous phase of water.

Ingredient (B) is dialkyltindicarboxylate. The dialkyltindicarboxylates are commercial materials. Preferred dialkyltindicarboxylates include dibutyltindiacetate, dibutyltindilaurate, and dioctyltindilaurate with dioctyltindilaurate most preferred. The dialkyltindicarboxylate can be used as is or it can be made into an emulsion. A suitable emulsion is produced by emulsifying 50 percent by weight of the dialkyltindicarboxylate with water using about 10 percent by weight of sodium alkylarylpolyether sulfonate as the emulsifying agent in any of the well known methods of producing oil-in-water emulsions.

Ingredient (C) is phenyltrimethoxysilane. The unique ability of the composition of this invention to form a putty upon drying rather than an elastomer, is dependent upon the use of phenyltrimethoxysilane. When other silanes such as methyltrimethoxysilane, vinyltrimethoxysilane, ethyltrimethoxysilane, methyltri(ethylmethylketoxime)silane, are used in place of the phenyltrimethoxysilane, an elastomeric product is produced upon drying the emulsion.

Ingredient (D) is an inert, non-siliceous filler. The filler is non-siliceous because the combination of ingredients (A) and (B) with a siliceous filler in an emulsion at a pH of greater than 9 will produce a reaction which appears to gradually crosslink the polymer, i.e., the modulus of the elastomer produced by drying the emulsion will gradually increase as the emulsion is aged. Inert fillers suitable for use in anionic silicone emulsions are well-known. The fillers are finely ground with average particle size below 10 micrometers, preferably below 2 micrometers. Examples of fillers include carbon blacks, titanium dioxide, clays, aluminum oxide, quartz, calcium carbonate, zinc oxide, mica, and various pigments. Titanium dioxide has been found to be particularly useful as an ultraviolet light screening agent. Calcium carbonate is a preferred filler for the caulking materials of this invention, particularly when it is ground to an average particle size of less than 1 micrometer.

The amounts of ingredients used in the composition of this invention are influenced, to some extent, by the requirements that the composition be of a paste-type viscosity as well as have a plasticity number of from 125 to 300 when the water is removed. If the emulsion of (A) has a solids content near the lower limit of 50 percent by weight, the amount of filler needed to obtain a paste-type viscosity, will be greater than if a higher solids emulsion is used for (A). The amount of filler necessary to obtain a paste-type viscosity is also dependent upon the kind and particle size of the filler chosen. These considerations are known to those skilled in the art and easily determined by simple experimentation.

The composition of this invention is based upon 100 parts by weight of the hydroxyl endblocked polydiorganosiloxane in the emulsion of (A). From 0.05 to 0.4 part by weight of dialkyltindicarboxylate (B) is used to catalyze the cure of the composition. Amounts in the lower part of the range are satisfactory when the amount of phenyltrimethoxysilane is in the upper part of its range while higher amounts of (B) are required when the phenyltrimethoxysilane is in the lower part of its range. The preferred amount is from 0.1 to 0.3 part by weight. The dialkyltindicarboxylate is preferably in the form of an emulsion as it is then more easily dispersed uniformly during mixing. The preferred dialkyltindicarboxylate is dioctyltindilaurate.

The phenyltrimethoxysilane (C) can be used over a range of from 1 to 12 parts by weight with a preferred range of from 2 to 8 parts by weight. Within the 2 to 8 parts by weight range, a softer putty is obtained by using less of the phenyltrimethoxysilane.

The amount of filler (D) can be varied from 50 to 200 parts by weight. The amount used is determined by the nature of the filler or fillers chosen. The preferred amount of filler is that which gives the desired paste-type viscosity. As more filler is added, the emulsion becomes more viscous. The preferred amount of filler is from 120 parts to 150 parts of the preferred calcium carbonate filler, having an average particle size of from 0.5 to 1.0 micrometers.

The silicone compositions of this invention are prepared by ordinary high intensity mixing of the ingredients until a uniform material is obtained. The emulsion of (A) is placed in the mixer, ingredients (B) and (C) are added and mixed, then the filler (D) is slowly added with mixing so that it is uniformly dispersed. Because the final mixture is of a paste-type viscosity, the equipment must be strong enough to properly mix the ingredients at this viscosity. In the laboratory, a stainless steel container is used with a propeller-type, air-driven mixer. It is not desirable to build up heat during the mixing process. If necessary, the emulsion can be cooled before the filler is mixed in. After a uniform paste is obtained, the mixture is placed under vacuum or centrifuged to remove air entrapped during the mixing process. The deaired mixture is then placed into a sealed storage container.

Additional ingredients which can be added to the composition include such things as antifoams to aid during the mixing process, freeze-thaw stabilizers such as glycols to protect the composition if it is accidentally frozen during storage, stabilizers such as organic amines, preferably 2-amino-2-methyl-1-propanol, and pigments such as titanium dioxide, carbon black, and organic pigments that are anionically stable to provide opaqueness or color to the cured caulking material.

The silicone composition of this invention is particularly useful as a caulking material. It can be easily extruded from a storage tube into place. Because it is an aqueous emulsion, it is easily tooled if necessary. Tools can be cleaned by washing with water. During cure of the emulsion, primarily water is given off so that there is no problem with odor. The cured material maintains its soft, putty consistency upon aging.

The following examples are included for illustrative purposes only and should not be construed as limiting the invention which is properly set forth in the appended claims.

All parts are by weight.

EXAMPLE 1

A series of emulsions were prepared which were of a paste or putty-like viscosity both before and after the water in the emulsion was removed.

An emulsion polymerized, hydroxyl endblocked polydimethylsiloxane having a weight average molecular weight of about 325,000 was first prepared. A mixture of 54 parts of water, 100 parts of low molecular weight linear hydroxyl endblocked polydimethylsiloxane fluid, and 4 parts of a surfactant consisting of 30% by weight sodium lauryl sulfate was homogenized, then mixed with one part of dodecylbenzene sulfonic acid and allowed to polymerize. After polymerization, the emulsion was made basic by adding 0.5 part of 50% aqueous diethylamine. The emulsion had a pH of approximately 10 and a solids content of about 60% by weight.

A series of pastes were prepared by mixing 300 g of the above emulsion (180 g of polydimethylsiloxane polymer) with 0.52 g of antifoam, the amount shown in Table I of a 50% aqueous emulsion of dioctyltindilaurate catalyst and the amount shown in Table I of phenyltrimethoxysilane. After about one minute of stirring, the amount shown in Table I of finely ground calcium carbonate, having an average particle size of about 0.7 micrometers, was mixed in until wet out and then mixing was continued for about 7 to 8 minutes to assure uniformity of the paste. Each mixture was of a paste viscosity such that it could be extruded from an ordinary tube such as is used for caulking materials.

A sample of each paste was extruded onto a surface to form a sample approximately ⅛ to 1/16 inch thick and the water was allowed to evaporate. The appearance of the dried and cured samples, after 5 days at 23° C. and 50% relative humidity, is shown in Table I. Each sample was measured for plasticity in accordance with ASTM D 926 to illustrate their deformability. A 3 g sample of the cured material was formed into a ball, then placed in the plastometer where the weight was applied to the sample for 3 minutes. The thickness of the sample, in millimeters at the end of the 3 minute period, times 100 is the plasticity number. The putties were soft, adhered to surfaces they were pressed against, did not flow under their own weight, and showed slight snapback when a piece was slowly pulled apart. The samples did not dissolve when immersed in water, except for Sample 9 which had a low amount of both catalyst and crosslinker present.

After aging for an additional 30 day period, the plasticity was again measured. The results are shown in Table I.

TABLE I

| Sample | DOTDL Emulsion grams | DOTDL pt/100 pt polymer | Phenyltrimethoxysilane grams | Phenyltrimethoxysilane pt/100 pt polymer | Filler grams | Filler pt/100 pt polymer | Plasticity Number | Appearance | After 35 days aging Plasticity Number | After 35 days aging Percent Change | After 55 days aging Plasticity Number | After 55 days aging Percent Change |
|---|---|---|---|---|---|---|---|---|---|---|---|---|
| 1* | 0.88 | 0.24 | 1.02 | 0.57 | 282 | 157 | 277 | drier than 2 | 358 | 29.2 | 388 | 40.1 |
| 2 | 0.88 | 0.24 | 4.08 | 2.27 | 282 | 157 | 130 | good putty | 147 | 13.1 | 160 | 23.0 |
| 3 | 0.88 | 0.24 | 12.24 | 6.80 | 282 | 157 | 162 | good putty | 188 | 16.0 | 193 | 19.0 |
| 4 | 0.88 | 0.24 | 20.4 | 11.3 | 282 | 157 | 198 | good putty | 224 | 13.1 | 234 | 18.0 |
| 5 | 0.2 | 0.06 | 12.24 | 6.8 | 282 | 157 | 145 | very soft | 168 | 15.9 | 180 | 24.0 |
| 6* | 2.0 | 0.62 | 12.24 | 6.8 | 282 | 157 | 389 | almost elastomeric | 389 | 0.0 | 404 | 3.9 |
| 7 | 0.88 | 0.24 | 12.24 | 6.8 | 250 | 139 | 150 | stickier than 3 | 170 | 13.3 | 180 | 20.0 |
| 8 | 0.88 | 0.24 | 12.24 | 6.8 | 350 | 194 | 284 | drier than 3 | 307 | 8.0 | 329 | 15.8 |
| 9* | 0.2 | 0.06 | 1.02 | 0.57 | 282 | 157 | 109 | dissolved in water | 119 | 9.2 | 130 | 19.3 |
| 10* | 2.0 | 0.62 | 1.02 | 0.57 | 282 | 157 | 381 | almost elastomeric | —** | — | — | — |

*Comparative examples
**Cured to elastomer
DOTDL = dioctyltindilaurate

EXAMPLE 2

A series of comparative examples were prepared to illustrate the uniqueness of phenyltrimethoxysilane as a crosslinking agent.

A series of pastes were prepared by mixing 300 g of the hydroxy endblocked polydimethylsiloxane emulsion of Example 1, 0.52 g of antifoam, 0.88 g of the dioctyltindilaurate emulsion of Example 1, and the amount and kind of crosslinking silane shown in Table II. After about one minute of stirring, 282 g of the calcium carbonate of Example 1 was added and mixed until uniform. Each mixture was of a paste viscosity.

A sample of each paste was extruded, dried, and tested as in Example 1 with the results shown in Table II. Each of these samples dried to an elastomeric product having the properties shown, rather than to a soft putty as did the compositions of Example 1.

TABLE II

| Crosslinker | | Durometer | Tensile Strength MPa | Elongation |
|---|---|---|---|---|
| | grams | | | |
| VTM | 0.74 | 13 | 0.85 | 1235 |
| VTM | 2.96 | 11 | 0.99 | 1270 |
| MTM | 0.68 | 11 | 0.72 | 1285 |

VTM = vinyltrimethoxysilane
MTM = methyltrimethoxysilane

EXAMPLE 3

Pastes prepared as in Example 1 in which the phenyltrimethoxysilane was replaced by either ethyltrimethoxysilane or methyltri(ethylmethylketoxime)silane cured to elastomers upon removal of the water.

EXAMPLE 4

A paste was prepared by mixing 300 g of the hydroxyl endblocked polydiorganosiloxane emulsion of Example 1, 0.88 g of the dioctyltindilaurate emulsion of Example 1, 12.2 g of phenyltrimethoxysilane and 282 g of the calcium carbonate of Example 1.

When extruded and dried, the material was of a putty consistency. The putty would form and reform to any shape, was tacky enough to adhere to most substrates, but was not messy to handle. The putty did not dissolve in water.

After storage in a tube for 8.5 months, a sample of the emulsion was extruded and dried. After aging for 90 days, the sample had a plasticity number of 282, indicating it was still a very soft material.

After storage in a tube for 9.5 months, a sample of the emulsion was extruded and dried. After aging for 60 days, the sample had a plasticity number of 279.

After storage in a tube for 8.5 months, a sample of the emulsion was extruded, dried, and placed in a weatherometer. After 526 hours exposure in the weatherometer, the sample had a plasticity number of 396.

That which is claimed is:

1. A silicone composition consisting essentially of the product obtained by mixing
   (A) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms or 2-(perfluoroalkyl)ethyl radicals having less than 7 carbon atoms per radical, present as an emulsion of dispersed particles in water, the emulsion having a pH of greater than 9 and a solids content of greater than 50% by weight,
   (B) from 0.05 to 0.4 part by weight of dialkyltindicarboxylate,
   (C) from 1 to 12 parts by weight of phenyltrimethoxysilane, and
   (D) from 50 to 200 parts by weight of inert, nonsiliceous filler having an average particle size of less than 2 micrometers,
to produce a material having a paste viscosity which, when the water is removed, has a plasticity number of from 125 to 300, is insoluble in water, and does not harden appreciably on aging.

2. The composition of claim 1 in which the polydiorganosiloxane is a polydimethylsiloxane having a weight average molecular weight in the range of from 200,000 to 700,000.

3. The composition of claim 1 in which the dialkyltindicarboxylate is selected from the group consisting of dibutyltindiacetate, dibutyltindilaurate, and dioctyltindilaurate, in an amount of from 0.1 to 0.3 part by weight per 100 parts by weight of the polydiorganosiloxane.

4. The composition of claim 1 in which the phenyltrimethoxysilane is present in an amount of from 2 to 8 parts by weight per 100 parts by weight of the polydiorganosiloxane.

5. The composition of claim 1 in which the filler is calcium carbonate.

6. The composition of claim 5 in which the calcium carbonate has an average particle size of from 0.5 to 1.0 micrometers and is present in an amount of from 120 parts to 200 parts by weight per 100 parts by weight of the polydiorganosiloxane.

7. The composition of claim 2 in which the dialkyltindicarboxylate is dioctyltindilaurate in an amount of from 0.1 to 0.3 part by weight, the phenyltrimethoxysilane is present in an amount of from 2 to 8 parts by weight, and the filler is calcium carbonate having an average particle size of from 0.5 to 1.0 micrometers and is present in an amount of from 120 parts to 200 parts by weight, all per 100 parts by weight of the polydimethylsiloxane.

* * * * *